United States Patent [19]

Tunnell et al.

[11] 4,376,474
[45] Mar. 15, 1983

[54] AUTOMATIC BRAKE SPEED BLEED SYSTEM

[75] Inventors: James H. Tunnell, Washington; Hugh V. Piper, Peoria, both of Ill.

[73] Assignee: Caterpillar Tractor Co., Peoria, Ill.

[21] Appl. No.: 251,524

[22] PCT Filed: Oct. 1, 1980

[86] PCT No.: PCT/US80/01300
§ 371 Date: Oct. 1, 1980
§ 102(e) Date: Oct. 1, 1980

[87] PCT Pub. No.: WO82/01169
PCT Pub. Date: Apr. 15, 1982

[51] Int. Cl.³ ............................................. B60K 41/26
[52] U.S. Cl. .................................... 192/4 A; 192/4 C
[58] Field of Search ............... 192/4 A, 4 C, 7, 8 R, 192/8 A, 8 C; 188/170; 303/71

[56] References Cited

U.S. PATENT DOCUMENTS

| | | | |
|---|---|---|---|
| 2,725,128 | 11/1955 | Martin | 192/4 A |
| 2,924,984 | 2/1960 | McFarland | 192/4 A |
| 3,136,399 | 6/1964 | Granryd | 192/4 A |
| 3,437,184 | 4/1969 | Wilson | 192/4 C |
| 3,635,317 | 1/1972 | Crabb | 192/4 A |
| 3,854,559 | 12/1974 | Talak et al. | 192/4 A |
| 4,020,932 | 5/1977 | Windish | 192/4 A |
| 4,024,936 | 5/1977 | Crabb | 194/4 A |
| 4,057,297 | 11/1977 | Beck et al. | 303/71 |
| 4,307,917 | 12/1981 | Hasselbacher et al. | 303/71 |

*Primary Examiner*—George H. Krizmanich
*Attorney, Agent, or Firm*—Wegner, McCord, Wood & Dalton

[57] ABSTRACT

A brake system (10) providing a self-bleeding and self-cleaning operation as a function of selective positioning of the transmission control (16) of the vehicle. The brake (12,13), in the illustrated embodiment, is a spring-applied, hydraulically released brake permitting the piston (24) to force hydraulic fluid and accumulated air from an upper portion (34) of the brake pressure chamber (23) outwardly through a bleed line (33) in which a flow restrictor (35) and a check valve (36) are provided. A brake fluid inlet supply line (14) communicates with a lower portion (22) of the pressure chamber (23) so as to permit flushing of debris from the lower portion (22) of the pressure chamber (23) concurrently with the self-bleeding operation.

14 Claims, 3 Drawing Figures

U.S. Patent    Mar. 15, 1983    4,376,474
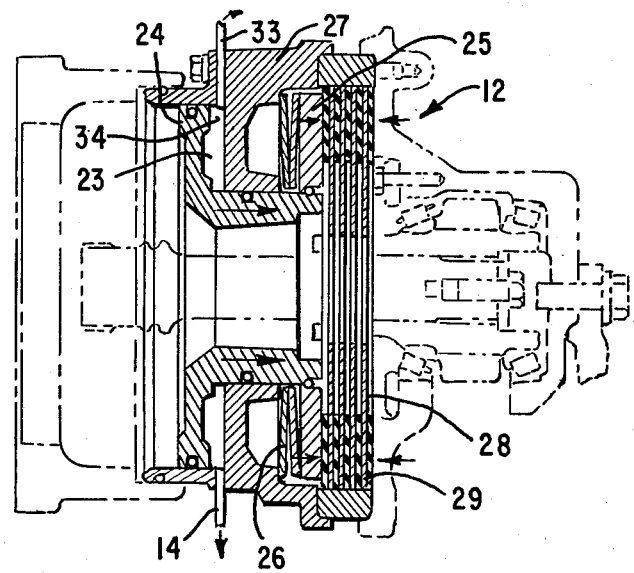
FIG. 1
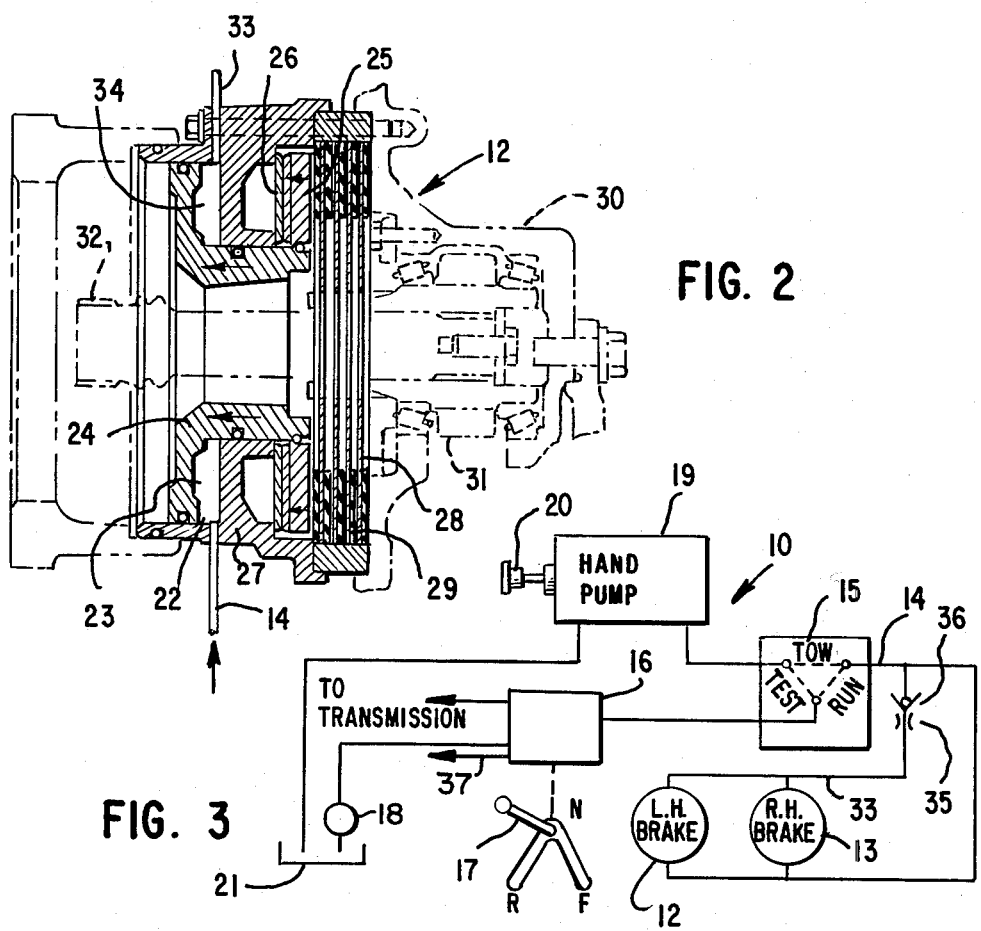
FIG. 2
FIG. 3

AUTOMATIC BRAKE SPEED BLEED SYSTEM

DESCRIPTION

1. Technical Field

This invention relates to brakes and in particular to hydraulic brakes as used in vehicles.

2. Background Art

In vehicles, such as tractors, hydraulic parking brakes are utilized which are applied when the transmission shift lever is placed in the neutral position. Over a period of time, air may become entrained in the brake fluid, possibly causing erratic or inconsistent braking operation.

In one conventional form of tractor vehicle utilizing such brakes, the brake fluid comprises a pressurized transmission replenishing circuit fluid. Conventionally, when the speed and direction control lever of the vehicle is in forward or reverse positions, the transmission fluid replenishing pressure overcomes the spring biasing of the hydraulic brakes to maintain the brakes released. When the speed and direction control lever is placed in the neutral position, the transmission replenishing pressure drops, permitting the brakes to become spring-applied and, thus, serve as parking brakes for the vehicle.

It has been conventional to provide means in association with the brakes to permit bleeding thereof to eliminate entrapped air from the brake which may collect in an upper portion thereof. One conventional form of bleeding means comprises a manual valve on the upper, or bleeder, line connected to the brake. To bleed the brake, the valve is opened and the transmission is engaged to pressurize the brakes. Such an operation may result in vehicle movement.

In such vehicle installations, it is further desirable, from time to time, to apply pressure to the brakes so as to release the brake notwithstanding the de-energization of the transmission fluid pressurizing means, such as when the vehicle is being towed. For this purpose, a special manually operable pump has been provided in combination with the bleeding means.

DISCLOSURE OF INVENTION

The present invention comprehends an improved brake system which provides automatic self-bleeding of the brake as a concomitant of normal operation of the vehicle.

More specifically, the invention comprehends the provision of means for bleeding air from the brake fluid as an incident of placing the transmission in the neutral mode.

The invention further comprehends the provision of means for flushing debris from a lower portion of the brake also as an incident of placing the transmission in the neutral mode.

The invention utilizes the spring means of the hydraulic brake as a means for forcing outwardly from the pressure chamber of the brake a quantity of the hydraulic brake fluid each time the brake fluid pressure is reduced, as by placing the transmission control lever in the neutral position.

More specifically, the invention comprehends the provision of means for passing outwardly from an upper portion of the pressure chamber a quantity of the hydraulic fluid and air collected therein for subsequent delivery to venting means eliminating the air from the liquid.

More specifically, the invention comprehends the provision in a brake system of a hydraulic brake provided with spring means for applying the brake and fluid pressure responsive means for overcoming the spring means for releasing the brake, the pressure responsive means defining a pressure chamber having a lower portion and an upper portion, a hydraulic liquid inlet to the lower portion, a control for selectively directing pressurized hydraulic liquid through the inlet to release the brake, and means for effecting self bleeding of the brake including a bleed outlet opening to the upper portion of the brake pressure chamber and connected parallel with the inlet, the outlet having a check valve permitting flow only outwardly from the upper portion of the brake pressure chamber whereby hydraulic liquid may pass into the pressure chamber only through the inlet, hydraulic liquid only is passed outwardly through the inlet and hydraulic liquid and air which may collect in the upper portion of the brake pressure chamber are passed outwardly through the bleed outlet by the action of the spring means when the control is arranged to relieve the hydraulic fluid pressure applied to the brake pressure chamber, and means for eliminating the air from the hydraulic liquid passed outwardly through the bleed outlet.

The means for restricting the flow of the fluid outwardly through the bleed outlet may comprise an orifice in series with the check valve.

Thus, the invention comprehends a novel and simple structure for providing automatic bleeding of the hydraulic brake system of a vehicle as a function of the shifting of the transmission of the vehicle and more specifically as a function of shifting of the transmission from time to time to the neutral mode. The invention eliminates the need for the time consuming bleeding operation required in the prior art structures and provides a more constant brake timing. Further, the system alleviates the problem of cold oil in the brakes and brake supply lines by more quickly warming up the oil due to circulation through the brake chamber in the operation of the vehicle.

Thus, the self-bleeding brake system of the present invention is extremely simple and economical of construction while yet providing the highly desirable features discussed above.

BRIEF DESCRIPTION OF THE DRAWING

FIG. 1 is a diametric section of the brake of a vehicle having a self-bleeding braking system embodying the invention, with associated portions of the drive structure shown in broken lines;

FIG. 2 is a view similar to that of FIG. 1 illustrating the arrangement of the brake upon release thereof; and FIG. 3 is a schematic diagram illustrating the self-bleeding brake system.

BEST MODE FOR CARRYING OUT THE INVENTION

In the illustrative embodiment of the invention as disclosed in the drawings, a self-bleeding brake system generally designated 10 is illustrated as for use with a vehicle, such as a track-type tractor, or the like. The tractor is provided with a transmission (not shown) and a pair of parking brakes 12 and 13. Each of the brakes comprises a spring-applied, hydraulically released brake, as best shown in FIGS. 1 and 2. The invention is concerned with the automatic bleeding of air from the brakes to provide an improved functioning of the braking system in the operation of the vehicle.

Each of brakes 12 and 13 is similar and thus the discussion of brake 12, as illustrated in FIGS. 1 and 2, equally applies to brake 13. As shown in FIG. 3, the brakes 12 and 13 are connected in parallel to a pressurized supply line 14 which is connected through a selector valve 15 to transmission fluid control means 16 having a speed and direction control lever 17. The control 16 provides pressurized transmission fluid from a pressure source 18 to supply line 14 whenever the control is disposed in a driving arrangement, i.e. either in the forward or rearward disposition, for causing the transmission to be operating in a forward or reverse mode. When the control 16 is set in the neutral position, the connection to the pressurized fluid supply is broken, thereby permitting the spring-applied brakes 12 and 13 to be set.

As further shown in FIG. 3, at times it is desirable to provide manually operable means for releasing the brakes 12 and 13, such as when the vehicle is being towed. For such purposes, a hand pump 19 is connected through the selector valve 15 to the supply line 14. The pump 19 may comprise a conventional pump having manually operable handle 20 for providing transmission fluid from a sump 21 under pressure to supply line 14 for releasing brakes 12 and 13 when desired. Illustratively, pump 19 may be operated to provide releasing fluid pressure to the brakes 12 and 13 for permitting the vehicle to be towed.

As shown in FIG. 2, when hydraulic pressure is delivered through supply line 14 to a lower portion 22 of a pressure chamber 23 of the brake, a piston 24 thereof is urged to the left carrying with it a pressure plate 25 against the biasing action of a pair of braking springs 26 which, in the illustrated embodiment, comprises a pair of Belleville springs captured between a portion of a housing 27 and the pressure plate 25. This releases a plurality of driven plates 28 of the brake from a plurality of friction plates 29 thereof.

In the embodiment of FIG. 2, the brake 12 is shown incorporated in the final drive case 30 which houses a drive pinion gear 31 carried on a final drive input shaft 32.

As indicated above, when the drive control of the vehicle is set in a driving disposition either in the forward or reverse mode, transmission pressure is provided to the brakes through control 16. The invention comprehends that when the drive control is moved to the neutral position, an automatic bleeding of air from the brake pressure chamber 23 is effected. In the illustrated embodiment, this is effected by the provision of a bleed outlet line 33 opening to an uppermost portion 34 of the pressure chamber 23 and in series with inlet supply line 14. As shown in FIG. 3, bleed line 33 is connected through a restrictor 35 and a check valve 36 to supply line 14. The check valve 36 prevents flow of hydraulic fluid inwardly through the bleed line 33 while cooperating with restrictor 35 in permitting restricted outward flow therethrough from the upper portion 34 of the pressure chamber 23.

As best illustrated in FIG. 1, when the transmission fluid pressure is reduced, such as when the transmission control is brought to the neutral position, the spring 26 urges the pressure plate 25 to the right, causing frictional engagement between the four steel driven plates 25 and five stationary friction discs 29 applying the brakes. At the same time, the volume of the pressure chamber 23 is reduced by the movement of piston 24 to the right in response to movement of the pressure plate 25, thereby urging the pressurized hydraulic fluid outwardly from the pressure chamber 23. A major portion of the hydraulic fluid may pass outwardly through line 14 from the lowermost portion 22 of the pressure chamber. Because of the restricting effect of restrictor 35, a smaller amount of hydraulic fluid, together with air which may have collected in the uppermost portion 34 of the pressure chamber 23, is passed outwardly from the pressure chamber through restrictor 35 and check valve 36, permitting the discharged air to be vented to the sump through a conventional low pressure return line 37 from the control 16 to the sump and thus from the system and, thus, effect a self-bleeding operation each time the control is brought to the neutral position.

By virtue of the connection of the supply line 14 to the lowermost portion 22 of the pressure chamber 23, debris is also expelled with the hydraulic fluid passing outwardly through the supply line 14 so that the brake system provides both automatic self-bleeding and self-cleaning operations as a function of the changing of the transmission mode.

INDUSTRIAL APPLICABILITY

The improved self-bleeding brake system 10 of the present invention is applicable to a wide range of vehicular and similar brake installations. The invention may be utilized, broadly, in connection with vehicles having a transmission and means for disposing the transmission selectively in driving and neutral modes. The invention comprehends, in broadest aspect, providing means for bleeding air from a hydraulic brake fluid as an incident of reducing the hydraulic fluid pressure.

Although the automatic bleed system 10 disclosed herein may be used with various braking systems, for convenience of illustration, the preferred embodiment is shown with reference to its use with a spring-applied, hydraulically released brake 12 and 13. In the illustrated embodiment, pressurized transmission fluid is utilized as the hydraulic brake fluid. As discussed above, the system further is arranged to flush debris from the pressure chamber 23 of the brake also as an incident of placing the transmission in the neutral mode.

The invention comprehends the use of a restrictor 35 for restricting the outward flow of hydraulic fluid and air from the uppermost portion 34 of the brake pressure chamber 23 in effecting the desired self-cleaning operation. The restrictor 35 is connected in series with a check valve 36 for assuring a one-way air bleeding movement through the bleed line 33.

The system may utilize a hand pump 19 for manually releasing the brakes when desired, such as for permitting towing of the vehicle.

In broad aspect, the invention utilizes the variable volume of the pressure chamber 23 of the brake in cooperation with the check valve 36 and restrictor means 35 of the system 10 to provide the highly desirable self-bleeding and self-cleaning operations.

Other aspects, objects and advantages of this invention can be obtained from a study of the drawings, the disclosure and the appended claims. The foregoing disclosure of specific embodiments is illustrative of the broad inventive concepts comprehended by the invention.

We claim:

1. In a vehicle having a transmission, means (16) for disposing the transmission selectively in driving and neutral modes, and a hydraulic brake (12,13) and means operatively connecting the brake to the transmission for releasing the brake as an incident of the transmission being placed in driving mode, the improvement comprising means (14,15,16,18,24,27,33,35,36) including first conduit means connected to an upper portion of the brake and second conduit means connected to a lower portion of the brake, said first conduit means being provided with means for permitting flow therethrough only outwardly from said brake upper portion for bleeding air from said upper portion of the brake and flushing debris from the lower portion (22) of the brake in response to placing the transmission in the neutral mode.

2. The vehicle brake system of claim 1 wherein said brake (12,13) comprises a spring-applied, hydraulically released brake.

3. The vehicle brake system of claim 1 wherein said transmission disposing means (16) includes means (14,33,35,36) for causing pressurized transmission fluid to serve as hydraulic fluid for controlling operation of the hydraulic brake (12,13).

4. The vehicle brake system of claim 1 wherein said bleeding means (14,15,16,18,24,27,33,35,36) comprises means for bleeding the air from an upper air-collecting portion (34) of the hydraulic brake.

5. In a brake system (10) having a hydraulic brake (12,13) provided with spring means (26) for applying the brake and fluid pressure responsive means (24) for overcoming the spring means (26) for releasing the brake (12,13), said pressure responsive means defining a pressure chamber (23) having a lower portion (22) and an upper portion (34), a supply line (14) to said lower portion (22), and a control (16) for selectively directing pressurized hydraulic liquid from a sump (21) through said supply line (14) to release the brake (12,13), means for effecting concurrent self-bleeding of the brake and self-flushing of debris from the brake, comprising:

a bleed outlet (33) opening to said upper portion (34) of the brake pressure chamber (23) and connected in series with said supply line (14), said outlet (33) having a check valve (36) permitting flow only outwardly from said upper portion (34) of the brake pressure chamber (23), hydraulic liquid passing into said pressure chamber (23) only through said supply line (14), hydraulic liquid only being passed outwardly through said supply line (14) and hydraulic liquid and air which being permitted to collect in said upper portion (34) of the brake pressure chamber (23) are passed outwardly through said bleed outlet (33) by the action of said spring means (26) when the hydraulic fluid pressure applied to the brake pressure chamber (23) is relieved; and means for connecting said bleed outlet (33) and supply line (14) to receive the hydraulic liquid from both the upper and lower portions of the pressure chamber (23) when the hydraulic fluid pressure is so relieved for subsequent return to the sump (21).

6. The brake system (10) of claim 5 wherein a flow restrictor (35) is connected in series with said check valve (36) in said outlet (33) for regulating the amount of fluid passed outwardly through said bleed outlet (33) by the action of said spring means (26).

7. The brake system (10) of claim 6 wherein said flow restrictor (35) comprises orifice means.

8. The brake system (10) of claim 5 wherein manually operable means (19) are provided for applying hydraulic fluid pressure to said pressure chamber (23) to release the brake (12,13).

9. In a vehicle provided with a speed and direction control lever (17) selectively positionable in forwardly, reverse, and neutral positions, and a brake system (10) having a hydraulic brake (12,13) provided with spring means (26) for applying the brake and fluid pressure responsive means (24) for overcoming the spring means (26) for releasing the brake (12,13), said pressure responsive means (24) in part defining a pressure chamber (23) having a lower portion (22) and an upper portion (34), a hydraulic liquid supply line (14) to said lower portion (22), and means (16) associated with said control lever (17) for selectively directing pressured hydraulic liquid from a sump (21) through said supply line (14) to release the brake (12,13) whenever the control lever (17) is in forward or reverse positions, means for effecting self bleeding of the brake (12,13) comprising:

a bleed outlet (33) opening to said upper portion (24) of the brake pressure chamber (23) and connected in series with said supply line (14), and having a check valve (36) permitting flow only outwardly from said upper portion (34) of the brake pressure chamber (23), hydraulic liquid passing into said pressure chamber (23) only through said supply line (14), hydraulic liquid only is passed outwardly through said supply line (14) and hydraulic liquid and air which may collect in said upper portion (34) of the brake pressure chamber (23) are passed outwardly through said bleed outlet (33) by the action of said spring means (26) as an incident of the control lever (17) being positioned in the neutral position to relieve the hydraulic fluid pressure applied to the brake pressure chamber (23); and means for connecting said bleed outlet (33) and supply line (14) to receive the hydraulic liquid from both the upper and lower portions of the pressure chamber (23) when the hydraulic fluid pressure is so relieved for subsequent return to the sump (21).

10. The vehicle brake system (10) of claim 9 wherein said brake (12,13) comprises the parking brake of the vehicle.

11. The vehicle brake system (10) of claim 9 wherein said vehicle includes a transmission fluid pressure source (18) cooperating with said control means (16) in utilizing pressurized transmission fluid as said hydraulic liquid.

12. The vehicle brake system (10) of claim 9 wherein means (35) are provided for causing the amount of hydraulic fluid passed outwardly through said bleed outlet (33) by said action of the spring means (26) to be substantially less than the amount passed outwardly through the supply line (14) thereby.

13. The vehicle brake system (10) of claim 9 wherein said bleed outlet (33) opens to the upper portion (34) of said pressure chamber (23).

14. The vehicle brake system (10) of claim 9 wherein said bleed outlet (33) opens to the upper portion (34) of the pressure chamber (23) and said supply line (14) opens to the lower portion (22) of said pressure chamber (23).

* * * * *